United States Patent

[11] 3,617,834

[72] Inventor Charles C. Rayburn
       Glenview, Ill.
[21] Appl. No. 68,272
[22] Filed Aug. 31, 1970
[45] Patented Nov. 2, 1971
[73] Assignee Illinois Tool Works Inc.
       Chicago, Ill.

[54] MONOLITHIC CAPACITOR COMPONENTS AND PROCESS FOR PRODUCING SAME
11 Claims, 7 Drawing Figs.

[52] U.S. Cl. .................................................. 317/261,
                                             29/25.42, 29/593
[51] Int. Cl. .................................................. H01g 3/26
[50] Field of Search .......................................... 317/261,
                                             242; 29/25.42, 593

[56] References Cited
UNITED STATES PATENTS
2,389,420  11/1945  Deyrup .................... 317/261 X
3,021,589   2/1962  Weller ..................... 317/261 X Primary Examiner—E. A. Goldberg
Attorneys—Robert W. Beart, Michael Kovac and Jack R. Halvorsen ABSTRACT: A monolithic capacitor component includes at least first and second layers separated by dielectric material and having nonoverlapping terminal portions of the electrode layers. Aligned with each electrode layer in the nonoverlapped area of the terminal portion is a nonactive electrode segment which is spaced from the electrode layer with which it is aligned. In the manufacture of such a component at least two electrode layers each having discrete electrode sections are separated dielectric and stacked and arranged relative to one another to provide overlapped terminal portions of the discrete electrode sections in the electrode layers whereby it is possible to sever the stacked and arranged dielectric and electrode layers in the area of the overlapped terminal portions to provide monolithic capacitor constructions.

PATENTED NOV 2 1971  3,617,834
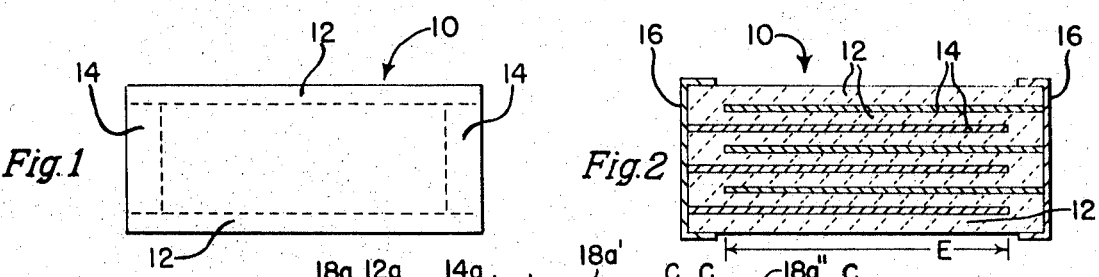
Fig.1
Fig.2
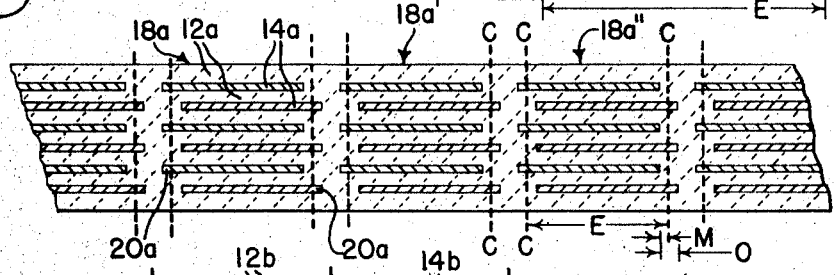
Fig.3
PRIOR ART
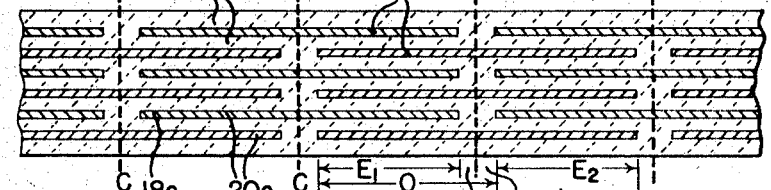
Fig.4
PRIOR ART
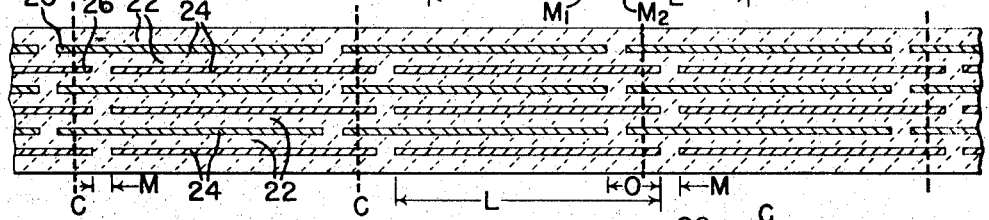
Fig.5
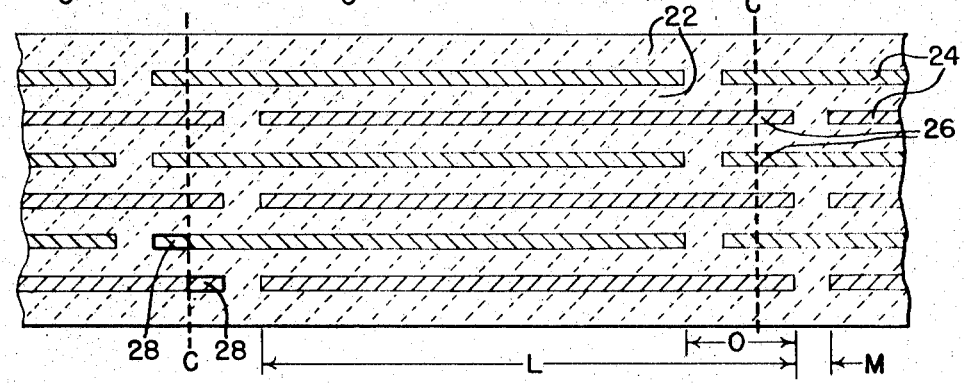
Fig.6
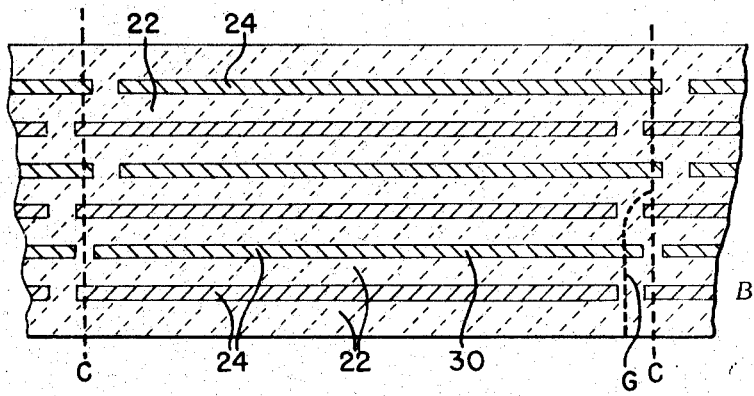
Fig.7
INVENTOR.
Charles C. Rayburn
BY
His Att'ys 3,617,834

MONOLITHIC CAPACITOR COMPONENTS AND PROCESS FOR PRODUCING SAME

SUMMARY OF THE INVENTION

The manufacture of monolithic ceramic capacitors, particularly of the miniature variety, is subject to many variables which are inherent in the manufacturing process. Some of the steps in the manufacturing process that result in imprecise or inaccurately formed capacitor units include the manufacture of dielectric and electrode raw material, the casting of the raw material into tapes, the printing of electrode layers or patterns on the tapes, and the separation by severing or cutting of stacked and laminated prearranged electrode and dielectric layers.

Much of the difficulty in the manufacturing process is attributable to the manner in which individual capacitor components are separated, by severing or cutting, from the stacked and laminated dielectric and electrode layers. One prior art process requires two cuts to form each end of a capacitor body, resulting in scrap being produced, and the movement of the cut line toward or away from the edge of the electrode layer may produce an open or shorted condition caused respectively by missing the electrode edge during the cutting process or intersecting electrodes of opposite polarity during the cutting process. In another prior art process only a single cut is required for each end of the capacitor body, but a small displacement of the cut line may nip an electrode of opposite polarity, thereby producing a shorted capacitor. In both prior art processes, the location of the cut line and the lateral offset of adjacent electrode layers, which are established in unrelated steps at different times in the manufacturing process, are the principal variables which can result in shorted capacitors being produced, especially when small margins are required by the capacitor design. Further, neither prior art process produces capacitors which fuse well at the cut line because the electrode configuration in both cases are sheltered from the parallel plate pressing force which laminates the dielectric and electrode layers. Improper fusing at the cut line results in crevices being formed in the outer edge of the capacitor in the vicinity of the exposed electrode layer which can extend through the margin of the capacitor to an opposite electrode layer. Foreign particles, dampness, and other undesirable elements which are located within the crevices can make a capacitor both electrically and mechanically undesirable.

It is one object of the present invention to provide a monolithic capacitor construction which is mechanically and electrically stable by being laminated or fused throughout its entire thickness and length.

Another object of the present invention is to provide a method for producing monolithic capacitor constructions which maintain full stack thickness at the cut line assuring full pressure and subsequent fusing of each layer.

A further object of the present invention is to provide a method which provides close tolerance or predetermined spacing between electrode sections in an electrode layer so as to be independent of the lateral offset between adjacent electrode sections as well as the cutting line.

Still another object of the present invention is to provide a method which permits displacement of the location of the cut line to a greater degree than is possible by prior art methods without producing "shorted" or "open" capacitor constructions.

A still further object of the present invention is to provide a process which can allow the capacitance per layer to be varied from a maximum value to near zero capacitance after the electrodes have been deposited or associated or associated relative to the dielectric material while maintaining the stack thickness, length, and width of the capacitor components constant.

Other objects and advantages of the present invention include a process for producing monolithic capacitor components which retains the benefits of prior art processes such as the severing of each end of the capacitor with one cut line so as to produce no scrap material, and the ability to upwardly adjust the capacitance by utilizing a previously disclosed component adjustment process.

The above and other objects and advantages of the present invention are attained by a capacitor construction which is produced by the steps of stacking at least two electrode layers separated by a dielectric layer wherein each electrode layer has a plurality of discrete electrode sections defining terminal portions which are separated from each other by a predetermined distance, arranging the dielectric and electrode layers relative to one another to provide overlapped terminal portions of the electrode sections in adjacent stacked electrode layers, and severing the stacked and arranged dielectric and electrode layers in the area of the overlapped terminal portions of the electrode sections in adjacent stacked electrode layers to provide discrete capacitor components. Capacitor articles thus produced are provided with electrode segments of limited length which are spaced from the electrode sections so as to not electrically interfere therewith, but which provide an electrically and mechanically stable capacitor configuration.

BRIEF DESCRIPTION OF THE DRAWING

FIG. 1 is a top plan view of a multilayer capacitor design of one of the typical configurations with which the present invention is concerned;

FIG. 2 is a sectional view of the capacitor configuration illustrated in FIG. 1;

FIG. 3 is a fragmentary sectional view of an array of dielectric and electrode layers illustrating one prior art technique for stacking, arranging, and severing the dielectric and electrode layers to form discrete capacitor units;

FIG. 4 is a fragmentary sectional view of an array of dielectric and electrode layers depicting another prior art technique for stacking, arranging, and severing the dielectric and electrode layers into discrete capacitor bodies;

FIG. 5 is a fragmentary sectional view showing an array of dielectric and electrode layers constructed in accordance with the present invention and illustrating the manner in which the layers are stacked, arranged, and severed to form capacitor components;

FIG. 6 is an enlarged fragmentary sectional view of the dielectric and electrode layer configuration illustrated in FIG. 5; and FIG. 7 is also an enlarged fragmentary sectional view of stacked and arranged dielectric and electrode layers constructed in accordance with the present invention and further depicting the manner in which a recessed electrode can be utilized in accordance with the teachings of the present invention.

BRIEF DESCRIPTION OF THE PREFERRED EMBODIMENTS

Multilayer capacitors are produced by stacking alternate layers of conductors (electrodes) and insulators (dielectrics). The dielectric layers electrically separate the electrode layers allowing a high potential to be sustained between the electrode layers. The electrodes and dielectrics may be chosen from a large selection of materials depending on desired characteristics. For example, a platinum electrode alloy is commonly used with a barium titanate dielectric, or an evaporated aluminum electrode is commonly used with organic dielectric film. Other suitable electrode and dielectric materials may be employed as will be apparent.

Depending on the dielectric and electrode materials used, various well-known processes may be employed to bond or laminate the layers together to form a monolithic structure. A typical multilayer capacitor is illustrated in FIGS. 1-2 of the drawing. The multilayer capacitor 10 there shown comprises a plurality of alternate dielectric and electrode layers 12, 14 which are bonded or laminated to each other. As will be apparent, the dielectric layers 12, because they serve as insulators, are provided on the uppermost and lowermost layers of the capacitor body 10, as seen in FIG. 2, as well as extend beyond the electrode layers 14 on opposite sides of the capacitor body 10, as seen in FIG. 1. The electrode layers 14 are laterally offset from one another and extend to opposite edges of the capacitor body 10 to permit an electrical connection to be made thereto. Conventionally, a conductive coating 16 is applied to the capacitor body 10 to electrically connect the exposed edges of the electrode layers on opposite sides of the capacitor.

The electric field of a multilayer capacitor as illustrated in FIGS. 1–2 is represented by the letter E which designates the overlapped areas of the electrode layers of opposite polarity. Thus, each pair of alternate electrode layers 14 which extend to opposite edges of the capacitor body are capable of developing a capacitance value or electric field in the area of the overlapped portions thereof.

Generally, there have been two dielectric and electrode layer configurations which have been used in the production of multilayer capacitors. These prior art techniques are illustrated in FIGS. 3–4 of the drawing and are so identified.

Referring first to the array of dielectric and electrode layers 12a, 14a illustrated in the prior art construction of FIG. 3 it will be seen that the electrode layers 14a each comprise a plurality of discrete electrode sections 18a, 18a′, 18a″, etc. Each of the electrode sections 18a of adjacent stacked electrodes are arranged in overlapping relationship, but include terminal portions 20a which are in nonoverlapping relationship in adjacent stacked electrode layers 14a.

The electrode layers 14a in the prior art construction represented in FIG. 3 of the drawing are stacked and arranged relative to one another in order that the array of stacked dielectric and electrode layers 12a, 14a can be severed along the cut lines C at each end of the capacitor body to be formed. Thus, two cuts C are required for each end of a capacitor body to be formed, thus resulting in scrap in the area between the double cut lines C at each end of a capacitor body to be formed.

The electric field length E of a capacitor formed by the process illustrated in FIG. 3, assuming constant electrode width and length, is determined by the offset O less the margin M. The offset O is determined by the amount of nonoverlapping relationship of electrode sections in adjacent stacked electrodes while the margin M is determined by the offset O and the cutting line C.

In the prior art technique represented by FIG. 3 of the drawing, the cut line C is critical. A slight movement of the cut line C away from the edges of the electrode sections can miss the electrode edge, thereby producing an "open" condition for one or more of the electrodes. A somewhat larger movement of the cut line C in the direction of the electrode edges may intersect electrode sections of opposite polarity, thereby producing a "shorted" condition. Thus, for any given capacitor the length of the margin M can vary so as to result in capacitance of unequal value.

Where capacitors are produced according to the technique of FIG. 3 employing ceramic dielectric material, the electrode thickness may be as much as one-half of the dielectric thickness in extreme cases, but is normally about one-quarter the thickness. When the stacked electrode and dielectric layers are compressed or laminated to each other by being pressed between parallel plates, the compressed stack thickness at the cut lines C in capacitors formed according to the FIG. 3 illustration may be about 90 percent of the thickness in the electric field region E. This is due primarily to the fact that when the electric field region E is compressed the full dielectric and electrode thickness is brought under compression between the parallel plates, while the margin areas of the capacitor see little or no compression since the terminal portions 20a of adjacent electrode sections are unsupported because they do not overlap. When the electrode and dielectric layers are bonded together by firing so as to vitrify them, the loose terminal portions 20a in the vicinity of the cut line C do not fuse properly and may leave crevices which can extend through the margin of the capacitor to an opposite electrode. Foreign particles, dampness, and other deleterious factors may invade the capacitor body so as to make it electrically and/or mechanically undesirable.

Similar difficulties are inherent in the prior art technique illustrated in FIG. 4 of the drawing even though this technique makes it possible to sever each end of the capacitor body with one cut line C, thereby producing no scrap. As can be seen, the stacked dielectric and electrode layers 12b, 14b, respectively are arranged relative to one another so that adjacent electrode sections overlap each other by approximately one-half of their length. This arrangement requires only one cut per each capacitor body and guarantees the contact to each electrode, although a small displacement of the cut line C may nip an opposite polarity electrode, thereby producing a "shorted" capacitor.

In the FIG. 4 prior art construction, the electric field length $E_1$ and $E_2$ for two respective capacitors are dependent upon the printed interelectrode spacing $M_1+M_2$, the lateral offset O of the terminal portions 20a of adjacent electrode sections, and the electrode length L.
Thus: $E_1 = O(M_1+M_2)$
also, $E_2 = L-(E_1+M_1+M_2)$
If $O \ L/2+(M_1+M_2)/2$
then $E_1 \ E_2$
and the capacitors are produced in two value distributions.

To obtain one distribution $E_1$ must equal $E_2$ which requires $$E_1 = E_2 = L - O.$$

In a multilayer production system there are two variables which lead to false assumptions in control and analysis of the system's performance. The margins M are determined by the interelectrode spacing, the positioning of the cut line C and the offset O. The cut line C and the offset O are two variables which are established in unrelated processes because they take place at different times and in different operations. The offset O is established during the stacking and arranging of the dielectric and electrode layers while the severing as represented by the cut line C takes place only after the capacitors have been stacked and arranged as well as being preferably compressed or laminated. These two variables frequently cause "shorted" capacitors to be produced, especially when small margins are required by the ultimate capacitor design.

As with the electrode design configuration of FIG. 3, the configuration of FIG. 4 does not fuse together well at the cut line C because its thickness is less than the thickness of the electric field region E because it is sheltered from the parallel plate pressing force. Crevices may thereby be opened up into the margin of the capacitor body that is to be formed which result in undesirable mechanical and/or electrical conditions.

Further, it is not possible with the electrode configuration design of the prior art as illustrated in FIG. 4 of the drawing to utilize the process for adjusting multilayer ceramic capacitors as disclosed and claimed in my application Ser. No. 29,944 filed Apr. 20, 1970. As fully described in that application, it is desirable to recess certain ones of the electrodes for subsequent exposure and contact in order to upwardly increase the capacitance value of a particular capacitor. In the FIG. 4 prior art system the electrodes are exposed and obviously cannot be recessed in the manner as suggested by my prior application.

In accordance with the present invention there is disclosed in FIGS. 5–7 of the drawing a unique system for producing capacitors as well as the ultimate capacitors to be formed, which attain the aforementioned objects.

Referring first to FIGS. 5–6 there is seen an array of dielectric and electrode layers 22, 24, respectively, which are stacked and arranged relative to one another to provide overlapped terminal portions 26 of adjacent electrode layers and aligned terminal portions 26 of alternate electrode layers. Each of the electrode layers are, as in the prior art techniques, designed to provide the predetermined spacing or distance represented by the margin M between the electrode sections in each of the electrode layers so as to provide the overlapped terminal portions 26 of adjacent electrode layers and aligned terminal portions of alternate electrode layers. The amount of overlap of adjacent electrode sections is illustrated in FIGS. 5-6 of the drawing to be materially less than the FIG. 4 prior art technique, but it will be appreciated that the amount of overlap may be varied to suit the particular capacitor configuration.

In the manufacturing process the margin M which represents interelectrode spacing is formed as the metal electrode is deposited on the dielectric substrate, as by printing. Since the dielectric material is isotropic and continuous, the margin spacing M does not need to be greater than the dielectric thickness, but in practice it may be five or more times the dielectric thickness to accommodate variations in the electrode edge.

It should be specifically noted that the margin M in the FIGS. 5-6 invention illustration is dependent only on control of the electrode deposition process, whereas in the prior art systems of FIGS. 3-4 the margin M is dependent not only on the electrode deposition but also upon the cut line C and the offset O. More specifically, the cut line C in the invention technique of FIGS. 5-6 is illustrated as being positioned in the area of the overlapped terminal portions 26. Even with a relatively large amount of displacement of the cut line C as might occur due to the vagaries of the manufacturing process, the possibility of developing a "shorted" or "open" capacitor is relatively remote. Further, the margin M remains constant once the electrode is deposited or associated relative to the dielectric material as distinct from the prior art techniques of FIGS. 3-4 where the margin M can vary dependent upon the location of the cut line C.

Since it is possible to produce a constant electrode section length L and interelectrode spacing or margin M dimensions when the electrode is deposited or associated relative to dielectric material, it follows that the electric field length E is a direct function of the terminal portion offset O as follows:

$$E = L - O = \text{constant} - O$$

Thus, for a given tape or array of dielectric and electrode layers the capacitance value is dependent only on the offset O. As the result, it is possible to provide a system which can allow the capacitance per layer to be varied from a maximum value to near zero capacitance after the electrodes have been deposited or associated relative to dielectric material with the stack thickness, length, and width remaining constant. A specific dielectric tape may be metallized, by depositing an electrode pattern thereof, then stacked, cut, and processed to produce completed monolithic capacitor components. The capacitance value of the capacitor components can be measured to provide information for use of the same metallized tape to make another desired capacitance value by simply computing and setting the required offset O before stacking and arranging the electrode layers relative to one another. In effect, premetallized dielectric tapes may be sampled, calibrated, and then stocked. The final value, as determined by the dielectric thickness, dielectric constant, and electrode width, are treated as constants and do not influence the final capacitance value.

The dependent variables in the multilayer capacitor process of the present invention is greatly reduced over the prior art processes and greatly simplified by the attainment of uniform capacitance value on a repetitive basis. Further, the time required to produce a specific capacitor from metallized tapes which are calibrated and stocked is significantly reduced.

The ultimate capacitor component produced by the invention described in connection with FIGS. 5-6 of the drawing create nonactive electrode segments 28 which are aligned with the electrode sections in the nonoverlapped areas of the terminal portions of the electrode sections. These nonactive electrode segments 28 maintain the full capacitor thickness at the cut line C in order to provide electrical and/or mechanical stability, and are designed so that they never become active since they are spaced from the edge of the electrode section with which they are aligned.

It may be desirable, in certain capacitor configurations, to provide an active recessed electrode which can increase the upward capacitance value of a particular capacitor component. As illustrated in FIG. 7 of the drawing, the recessed electrode 30 is arranged in the second electrode layer so as to be just inside the cut line C. In accordance with the teachings of my prior application Ser. No. 29,944 filed on Apr. 20, 1970, a grind cut represented by the letter G on one end of the capacitor body that is ultimately formed will expose the electrode 30 for electrical connection and inclusion if more capacitance is desired. This is all more fully explained in my aforementioned patent application. It is significant to note, however, that the method of the present invention as described in connection with FIGS. 5-6 of the drawing enable the use of the capacitor adjustment system as disclosed and claimed in my prior application.

From the foregoing it will now be appreciated that the present invention discloses a unique process for the manufacture of multilayer monolithic capacitor components which makes high-speed, economical and accurate production of capacitors and at the same time enables adjustment of the capacitance value, either upward or downward, for a given group of capacitors to be made during the manufacturing process and by enabling the capacitance to be increased after the manufacturing process, if such is desired.

I claim:

1. The method of manufacturing monolithic capacitor components comprising the steps of stacking at least two electrode layers separated by a dielectric layer, each electrode layer having a plurality of discrete electrode sections wherein the terminal portions of each discrete electrode section are separated from adjacent discrete electrode sections by predetermined spacing; arranging the dielectric and electrode layers relative to one another to provide overlapped terminal portions of the electrode sections in adjacent stacked electrode layers; and severing the stacked and arranged dielectric and electrode layers in the area of the overlapped terminal portion of the electrode sections in adjacent stacked electrode layers to provide discrete capacitor components.

2. The method as defined in claim 1 wherein the stacking and arranging of the ceramic and electrode layers is substantially simultaneously performed.

3. The method as defined in claim 1 including the step of compressing the stacked and arranged dielectric and electrode layers prior to severing the same to form a laminated construction.

4. The method as defined in claim 3 including the step of firing the discrete capacitor components to vitrify them.

5. The method as defined in claim 4 including the step of applying a conductive coating to exposed electrode edges of each discrete capacitor component to permit electrical connections to be made thereto.

6. The method as defined in claim 1 including the step of selecting the predetermined spacing on at least one electrode layer to intersect with the line of severance to provide a recessed, nonactive electrode until exposed by removing dielectric material in the vicinity of the recessed electrode.

7. The method of manufacturing monolithic ceramic capacitor components comprising the steps of stacking and arranging a plurality of ceramic layers each having a preprinted electrode pattern with predetermined spacing to provide overlapped terminal portions of adjacent electrode patterns and aligned terminal portions of alternate electrode patterns; compressing the stacked and arranged ceramic layers with electrode patterns printed thereon to form a laminated structure; severing the laminated structure in the area of the overlapped terminal portions of the adjacent electrode patterns to form discrete capacitor bodies; and firing the discrete bodies to form monolithic ceramic capacitor components.

8. The method as defined in claim 7 further including the steps of determining the capacitance value of the monolithic ceramic capacitor components, resetting the predetermined spacing between the electrode sections of each electrode layer to raise or lower the capacitance value per capacitor, and then repeating the procedural steps to produce monolithic ceramic capacitor components of different capacitance value.

9. The method of manufacturing monolithic capacitor components comprising the steps of providing a plurality of alternate ceramic and electrode layers, each electrode layer having discrete electrode sections defining terminal portions separated by a predetermined spacing; stacking and arranging the ceramic and electrode layers in alternate fashion to provide overlapped terminal portions of adjacent electrode layers and aligned terminal portions of alternate electrode layers; compressing the tacked and arranged dielectric and electrode layers to form a monolithic construction; severing the stacked and arranged dielectric and electrode layers in the area of the overlapped terminal portions of adjacent electrode layers to provide discrete capacitor components; firing the capacitor components; and applying a conductive coating to the exposed electrode edges of each electrode layer to permit electrical connection to be made thereto.

10. A monolithic capacitor comprising first and second electrode layers separated from each other by dielectric material, the first and second electrode layers being laterally offset from one another by a predetermined distance to provide terminal portions of the electrode layers in nonoverlapping relationship, nonactive electrode segments aligned with each of the electrode layers in the nonoverlapped area of the terminal portions of the electrode layers, each nonactive electrode segment having a measurement less than the predetermined distance so as to be spaced from the electrode layers.

11. The capacitor as defined in claim 10 wherein the nonactive electrode segments extend from the outermost edge of the capacitor and terminate short of the electrode layer with which it is aligned.

* * * * *